United States Patent [19]

Pinto

[11] Patent Number: 4,657,444
[45] Date of Patent: Apr. 14, 1987

[54] SYNCHRONIZED CHUTE FEED CONTROL SYSTEM AND METHOD

[75] Inventor: Akiva Pinto, Gastonia, N.C.

[73] Assignee: Hergeth Hollingsworth GmbH, Duelmen, Fed. Rep. of Germany

[21] Appl. No.: 758,343

[22] Filed: Jul. 24, 1985

[51] Int. Cl.<sup>4</sup> ............................................. B65G 53/66
[52] U.S. Cl. ....................................... 406/23; 19/105; 406/28; 406/70
[58] Field of Search ...................... 406/70, 28, 23, 19, 406/12; 19/105, 240, 300

[56] References Cited

U.S. PATENT DOCUMENTS 3,169,664  2/1965  Meinicke ........................... 222/56 X
4,387,486  6/1983  Keller et al. ........................... 19/105
4,510,647  4/1985  Keller et al. ........................... 19/105

Primary Examiner—Jeffrey V. Nase
Assistant Examiner—Daniel R. Edelbrock
Attorney, Agent, or Firm—Cort Flint

[57] ABSTRACT

A control system for a textile chute feed is disclosed which includes first and second fiber quantity signals generators (A, B) which generate first and second fiber quantity signals (52, 54) proportional to sensed fiber volumes in chute (16). A fiber delivery weight signal generator (C) generates a delivery weight signal (60) proportional to the delivery weight of the fibers in the fiber batt (44). A delivery roll signal generator (D) generates a signal proportional to the rotational speed of the delivery roll (38). The fiber quantity signal (52) is integrated with a delivery roll signal (68) in a first controller device (70) to produce a feed roll control signal (71). The delivery weight signal (60) and the delivery roll signal (68) are integrated in a controller (74) to produce a control signal (75) which controls the oscillation of an oscillating fiber compaction plate (28). When the delivery weight signal (60) falls below a preset delivery weight signal (78), an airflow control signal (76) is produced by the controller (74) to control an air pump (22) and increase the air pressure in the formation chamber (16) to assist in compacting the fibers (42). When the rotation of the delivery roll (38) falls below a preset delivery roll signal (80), the feed roll control signal (71) is modified to rotate the feed roll (18) in an intermittent manner. When the second fiber quantity level represented by signal (54) is reached, the controller (70) terminates the rotation of the feed roll (18) until the fiber supply is reduced to a safe level.

17 Claims, 4 Drawing Figures

SYNCHRONIZED CHUTE FEED CONTROL SYSTEM AND METHOD

BACKGROUND OF THE INVENTION

The invention relates to a chute feed which receives fiber tufts, forms them into a compacted matt, and discharges the fibers in the form of a fiber batt having a prescribed weight per unit length. The chute feed typically is utilized to feed the batt to a carding machine which separates out the immature, very short fibers and aligns the useful longer fibers into an opened, more parallel orientation as a web which is then drawn off in the form of a sliver strand or a web for, respectively, forming yarn or non-woven fabric.

The quality of the sliver or web produced by the card can depend largely upon the quality and uniformity of the fiber batt discharged by the chute feed. A high quality fiber batt usually is quite uniform in bulk density across its width to provide a desired consistent prescribed weight per unit length of the batt.

The chute feed typically includes a lower batt formation chute having a feed roll for feeding fiber into the chute, and a pair of delivery rolls which discharge the fiber batt. There is an upper fiber tuft reserve chute which receives and accumulates fiber above the feed roll. The feed roll then feeds these fibers to an opening roll which opens the fiber tufts by subdividing the tufts and delivers them to the batt formation chute. Optionally, an oscillating plate compacts the fibers in the batt formation chute to discharge a fiber batt having a prescribed weight. For this, the weight of the batt formed by the chute feed may be sensed and a signal representative of the sensed weight may be generated to control the speed of oscillation of the plate.

The quantity of fiber in the batt formation chute also may be sensed and used to control the operation of the feed roll and hence the influx or receipt of fiber into the batt formation chute. The feed roll typically is operated intermittently, which is to say, "on" and "off," in response to sensing fiber by some level sensor in the chute such as a photocell. The feed roll stops or rotates in response respectively to the presence or absence of fiber at the level monitored by the photocell. This intermittent operation may result in fluctuations in the feed of fiber to an impermissible degree forming cyclic "thins" and "thicks" in the fiber batt produced over the time period of operation.

A control system for a chute feed is disclosed in U.S. Pat. No. 4,387,486 wherein the speed of the card is sensed to generate a signal used to control the speed of the feed roll motor and also of the oscillation plate motor in a continuous manner. The weight of the batt received by the card is sensed and a representative signal is utilized to override the primary drive for the oscillating plate to change its speed and thus to vary the ratio between the speed of the card and speed of the plate. The level of fiber in the formation chute is sensed and a signal is generated which is used to override the primary signal to the feed roll to vary the speed of the feed roll and thus the ratio between the speed of the card and the speed of the feed roll.

U.S. Pat. Nos. 4,403,374; 4,404,710; 3,728,759; and 3,169,664 utilize air pumps and fans to compact fibers in a chute of a feed chute. In U.S. Pat. No. 4,404,710 the weight of the fiber batt is sensed and a signal generated which controls the operation of the air blower and the top feed roll.

U.S. Pat. No. 3,169,664 discloses a level sensor which controls the "on" and "off" operation of a feed roll for maintaining the fiber level at or below that of the sensor in a chute feed. Air pressure compacts the fibers and increased air pressure is provided when the carding machine is started.

While U.S. Pat. No. 4,387,486 provides a suitable control system for operation of a feed chute in response to the operation of a standard width carding machine, the advent of the modern wide carding machines, up to four meters in width, may create problems with conventional control systems. Moreover, it is desirable to provide a chute feed which is synchronized in a self-contained manner and may be easily utilized with associated machinery other than a carding machine operation. Regarding the wide carding machines, it has been found that under certain adverse conditions, the level or volume of the fiber may continue to build unduly in the chute due to its extreme width and that adequate control need be provided. In certain other instances, it may prove necessary to provide yet additional compaction of the fibers beyond what is possible by the normal operation range of the oscillating plate in the wide carding machines due to their large chute volumes.

It may also prove to be desirable to be able to modify continuous feed roll operation and control the feed roll intermittently at certain low speeds of the delivery roll, such as during card start-up, in order to obviate feed of non-uniform weights of fiber tufts. When the speed of the bottom delivery rolls falls below some certain value, a too slow rotation of the feed roll may result in feeding nonuniform weights of fiber tufts per unit time to the batt formation chute. However, by operating the feed roll intermittently but at speeds above this too slow speed, nonuniform tufts may be prevented without excessive feed of fiber and the undesired oversupply.

Accordingly, an objective of the present invention is to provide a control system for a feed chute by which a fiber batt having a uniform bulk density across its width is produced under normal operation of the feed chute.

Another object of the present invention is to provide a control system for a chute feed where the speeds of the feed roll and the oscillating compaction plate of a batt formation chute are synchronized in operation with the rotational speed of a delivery roll, and other factors caused by the large width of the chute in the range of three to four meters are taken into affect.

Still another object of the present invention is to provide a control system for a chute feed having a batt formation chute with a fiber feed roll and an oscillating fiber compaction plate wherein fiber compaction may be automatically augmented by compressed air as desired.

Yet another object is to provide the aforesaid control system wherein fiber compaction may be automatically augmented by compressed air as desired, and wherein the speed of the feed roll is automatically controlled in response to signals generated upon attaining conditions of an oversupply of fibers in the chute or a too slow delivery roll speed to terminate fiber feed.

SUMMARY OF THE INVENTION

The above objects are accomplished according to the present invention by providing a control system for a chute feed of the type having a feed roll, a batt formation chute to which fibers are fed from the feed roll, and an oscillating plate which compacts the fibers in the formation chute prior to discharge in the form of a compacted fiber batt by a pair of bottom delivery rolls. The system includes a fiber quantity signal generator for sensing the quantity of fibers contained in the formation chute and for generating a fiber quantity signal proportional to or indicative of the sensed quantity of fibers. A batt delivery weight signal generator is provided to sense the delivery weight per unit of batt length of the fibers discharged in the form of a batt from the chute feed and to generate a delivery weight signal. A delivery roll speed signal generator senses the rotational speed of the delivery roll to generate a delivery roll speed signal proportional to the roll speed. The fiber quantity signal and delivery roll signal are transmitted to a controller device which may integrate the signals in such a way as to produce a feed roll control signal for control of the rate of rotation of the feed roll. The delivery weight and delivery roll speed signals are also integrated by a controller device to generate an oscillating plate control signal for controlling the oscillating speed of the plate in proportion to the delivery weight of batt being produced. The operation of the feed roll and oscillating plate are thus coordinated with the delivery roll speed so that the chute feed is synchronized in a self-contained manner.

To facilitate compaction of a large volume of fibers as is found in the modern wide carding machine, a preset delivery weight signal is provided to the controller indicative of the desired weight per unit length of batt to be delivered. When the batt delivery weight falls below the desired weight and the preset signal, the controller generates an air control signal to increase the operating speed of an air pump, such as a fan, and thus increases the pressure of the air delivering the fibers into the formation chute for assisting the oscillating plate in compacting the fibers. A preset delivery roll signal is input to the controller which represents a prescribed delivery roll speed. When the delivery roll signal falls below the preset delivery roll signal, the feed roll control signal is modified to control the feed roll intermittently. The intermittent operation of the feed roll reduces the feeding of large, non-uniform fiber tufts to the formation chute as would occur if the feed roll were operated at a slow, continuous speed.

A second fiber quantity signal generator senses an excessive amount of fibers above the desired normal level in the event of overfilling in the formation chute to generate a second fiber quantity signal which the controller receives to terminate operation of the feed roll. The quantity of fibers in the formation chute is terminated as fibers are removed in the form of the batt to prevent an unacceptable buildup of the fibers in a wide chute.

DESCRIPTION OF THE DRAWINGS

A preferred embodiment designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
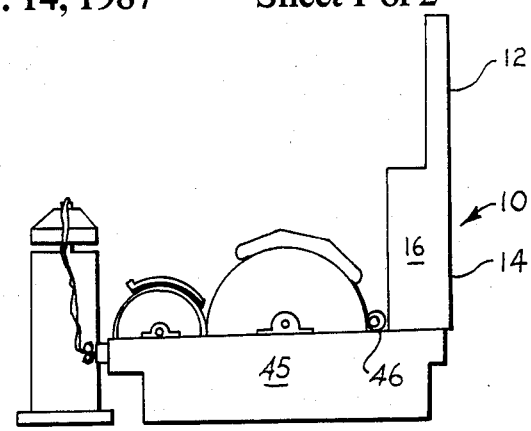
FIG. 1 is a side elevation diagramatically illustrating a feed chute to which the present invention pertains as applied to the feeding of a fibrous batt to a carding machine.

Referring now in more detail to the drawings, a chute feed is illustrated generally at 10 having an upper reserve section 12 and a lower formation section 14 with a batt formation chute 16. Fibers from a chute of the reserve section 12 at a throat 19 (FIG. 4) enter into the formation chute 16 by way of a feed roll 18. Beneath the feed roll 18 is a fiber opening roll 20, normally rotated at a constant speed, which opens the fibers as they are received from the feed roll 18. There is an airflow means in the form of a blower fan 22 which delivers an airflow along an airflow pathway as shown by arrows 24 around the opening roll 20 and down into the chute 16 for delivering the fibers which are opened by the roll 20, into the formation chute 16. The airflow also assists in removing the fibers from the pins 20a of the opening roll 20 so that they, too, may be delivered into the formation chute 16.

The fiber-containing channel of formation chute 16 is defined by a wall 25 and an opposing wall 26 which includes an oscillating plate 28 perforated at 30 to allow for the passage of air through the plate. The plate 28 pivots about 32 and is oscillated by bell crank 34 driven by a drive motor 36. At the bottom of the formation chute is a delivery roll means in the form of a pair of delivery rolls 38 and 40 which discharge the fiber 42 from the formation chute in the form of a fibrous batt 44. The fibers are compacted by the oscillating plate 28 prior to discharge to form a batt 44 having a prescribed weight which is discharged from the chute feed 10. The above described features are well known and shown in U.S. Pat. Nos. 4,476,611 and 4,387,486 which may be referred to for more detail.

Figure 4:
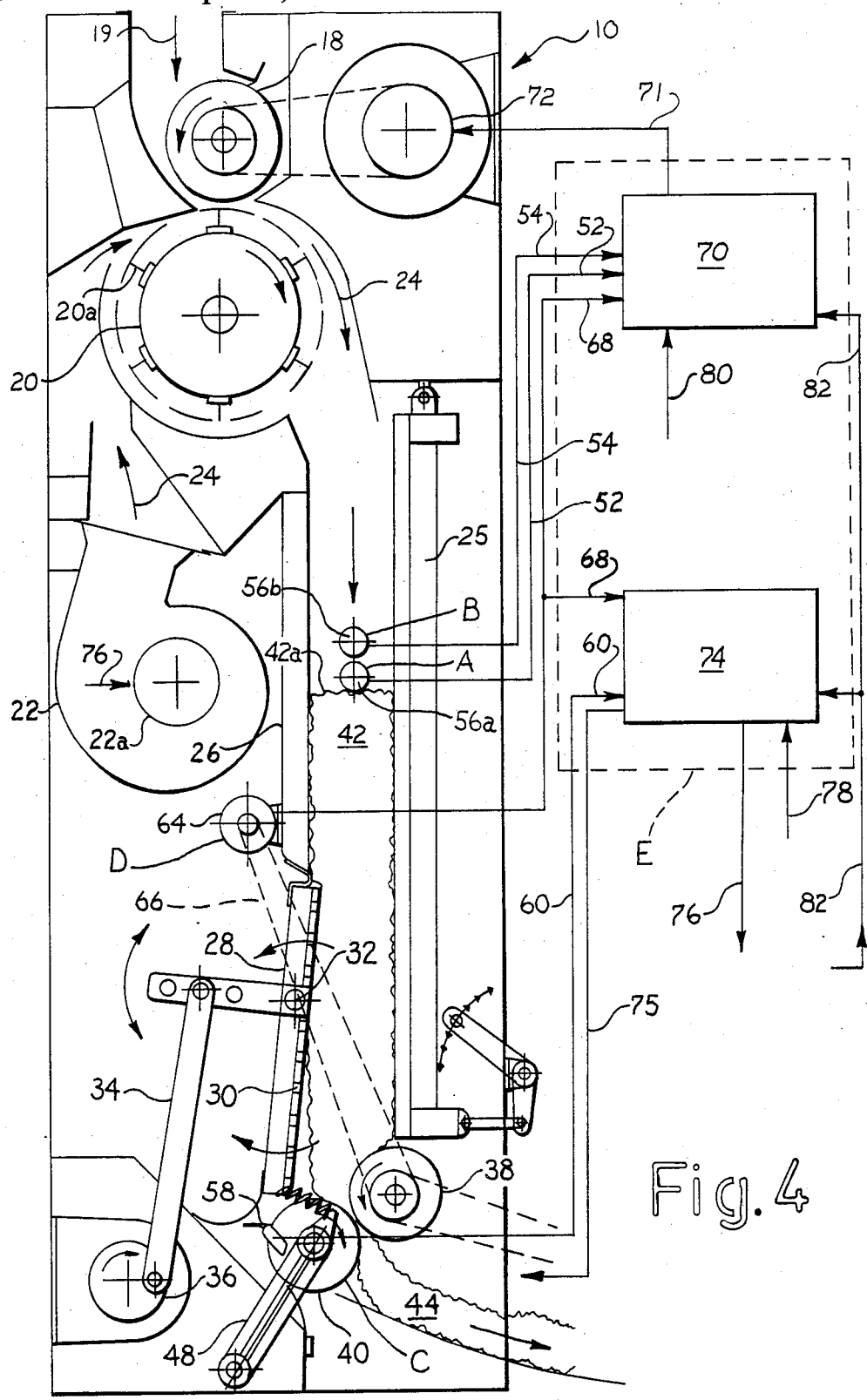
FIG. 4 is a schematic diagram illustrating a chute feed and control system constructed in accordance with the present invention.

The delivery roll 38 is normally driven in a positive manner, and an object of the present invention is to coordinate the operation of the chute feed with the operation of delivery roll 38. For example, as illustrated in FIGS. 1 and 4, the chute feed may be utilized to deliver a fiber batt 44 to a carding machine 45. In this case, the delivery roll 38 may be driven from the feed roll 46 of the carding machine (FIG. 1).

The roll 40 is mounted on a displaceable, biased, pivotal arm 48. In this instance, the degree of displacement of the delivery roll 40 by the fibrous batt 44 is some function of the weight of the fibrous material delivered between the nip of the rollers 38, 40. This will be explained in more detail later.

Referring now in more detail to the present invention, by reference to FIG. 4, there is illustrated a first fiber quantity signal generator means A for sensing a first quantity of fiber in the formation chute and generating a first fiber quantity signal 52 representative of the sensed quantity of the fibers 42 present in the formation chute 16.

There is a second fiber quantity signal generator means B which senses a second quantity of fiber in the formation chute 16 greater than the first quantity of fiber. The second fiber quantity signal generator generates a second fiber quantity signal 54 which is representative of the second quantity of fibers in the formation chute.

The first fiber quantity which is sensed is preferably a fiber condition at a first level in the formation chute. The second fiber quantity is a fiber condition at a second level in the formation chute above the first level. The fiber quantity condition may be either the presence or absence of fiber at the first and second levels. Since the dimensions of the chute are defined, the fiber level detection will be indicative of fiber volume.

The fiber quantity signal generator means A and B are illustrated as comprising conventional photocell devices. A photocell sensor 56a senses the first level of fibers by sensing the level 42a of the fibers 42 at a first vertical location in the chute. A second photocell 56b senses the level of the fibers and is disposed in the formation chute vertically above the first photocell 56a. This ensures that the fibers 42 do not build up in the chute under certain adverse conditions beyond the level of photocell 56b. Overfilling of fibers beyond this level may result in unsafe operation and be troublesome in modern wide feed chutes. It is to be understood, of course, that other types of detector devices for detecting the presence or absence of fiber at the prescribed levels and volumes in the chute may be utilized.

A delivery weight signal generator means C which includes the displaceable roll 40, senses a function of the weight of fibers in the fiber batt 44 by sensing the degree of displacement of said feed roll 40. For this purpose, there is a sensor 58 which senses the degree of displacement of the displaceable feed roll 40 and generates a fiber delivery weight signal 60 representative of the roll 40 displacement and hence is reflective the weight of the fiber batt 44 to be delivered between to nip of the feed rolls 38 and 40. The sensor 58 may be a conventional proximity switch which is stationary and senses the proximity of the lever 48 of the displacement roll.

There is a delivery roll speed signal generator D which may be a conventional tachometer 64 connected to the rotating delivery roll 38 by means of a belt 66. The delivery roll signal generator means D senses the rotational speed of the delivery roll 38 and generates a delivery roll speed signal 68 representative of the rotational speed of the delivery roll.

There is a control means E to which the various heretofore described signals are input. The control means includes a programmed controller for controlling the feed roll 18 and oscillating plate 28. The controllers consist of conventional integration circuits or chips which consist of entirely conventional electronic circuits that function to integrate the input signals and produce an output control signal which has a predetermined relationship to the input signals according to a desired program in a manner that is well known in the automatic programming and control art. The control means E includes a first controller 70 for producing a feed roll control signal 71 for controlling the drive 72 of feed roll 18. The control means includes a second controller 74 for producing an oscillating plate control signal 75 for controlling the drive 36 of the oscillating plate 28, and also an airflow control signal 76 for controlling the drive motor 22a of the blower 22. The airflow control signal causes the air pressure to be increased in the formation chute for extra fiber compaction.

A preset batt delivery weight signal 78 is input to the controller 74. A preset delivery roll speed signal 80 is input to the controller 70. The purpose of these preset signals will be explained later. There is an input signal 82 which represents information regarding the operating condition of the carding machine 45 (FIG. 4) to which the fibrous batt 44 is being fed. For example, the carding machine may be stopped or the carding machine may be in a starting condition. In the start-up conditions the carding machine is first operated at a slow acceleration, then at a slow level speed, while the attendant puts up the end of the fiber, whereafter the card then accelerates more rapidly to a normal operating speed where it levels off. This information is processed by the control system of the present invention for controlling the operation of the feed chute accordingly when used to feed a card in the illustrated embodiment.

OPERATION

Referring now to the operation of the device, it can be seen that the feed roll 18 is driven continuously to feed fibers from the reserve section to the opening roll 20 rotating at a constant speed. The fiber quantity signal 52 from the photocell 56a and delivery roll signal 68 may be integrated to produce a continuous feed roll output signal 71 whereby the feed roll operation is synchronized with the delivery roll 38 and the operation of the oscillating plate 28.

The feed roll maintains the level 42a of fibers in the chute generally at the level of the first photocell 56a. When the photocell 56a is blocked, the speed of the feed roll 18 is slowed down, and when the cell is unblocked, the speed of the feed roll 18 is increased in a continuous fashion. Should the level 42a of the fibers reach the upper photocell 56b under certain adverse conditions in the chute such as an oversupply of fibers due to uncontrollable circumstances, the fibers 42 will block the photocell 56b causing a fiber quantity signal 54 to be input to the control 70. A feed roll control signal 71 terminates the operation of the feed roll 18 momentarily until the photocell 56b becomes unblocked.

Figure 3:
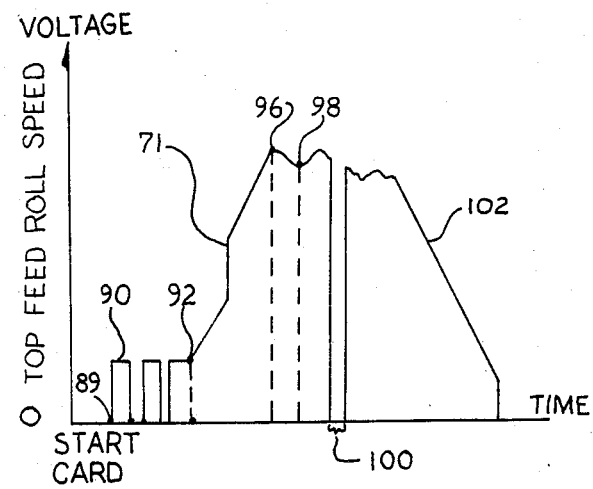
FIG. 3 is also a graph illustrating control operation of the top feed roll in accordance with the present invention.

Referring now in more detail to FIG. 3, the operation of the feed roll 18 in response to the sensed fiber quantity of signals 52, 54 will be described in more detail wherein the delivery roll signal 68 is a function of the operation of a carding machine. FIG. 3 is a graph showing the feed roll control voltage 71 of the feed roll versus time. During the starting of the carding machine at 89, the bottom delivery roll 38 will be operated at a reduced speed relative to its normal operation. The reduced speed of the delivery roll 38 wil be represented by the delivery roll speed signal 68 which will be below the preset delivery roll speed 80 in this instance. The controller 70 will produce a feed roll control signal 71 which modifies the continuous rotation of the feed roll 18 and operates it in an intermittent manner as shown by the rectangular pulses 90. The card input information 82 will also be processed with the delivery roll signal 68 at this time.

The top feed roll control voltage and speed increase as the carding machine accelerates to its operational speed and in proportion to the increase in the delivery roll 38 speed. During this time the fiber quantity signal 52 will indicate that the fiber has not yet reached level photocell 56a so that the feed roll speed will continue to increase until it reaches the point 96 whereupon the fiber quantity 42a will block the photocell 56a. The feed roll speed will be decreased until reaching point 98 indicating that the fiber has dropped below the level of the photocell 56a. The delivery roll speed will then be increased again. This increase/decrease integrated curve is produced over the cycle of the feed chute during the normal operating speed of the carding machine. Should the fiber level reach the upper safety limit photocell sensor 56b, the top roll feed will immediately be cut off as indicated by portion 100. Curve 102 shows the voltage signal 71 during the time that the carding machine is decelerated to a stopped condition whereupon the feed roll is terminated in response to the fiber quality and delivery roll signals.

Figure 2:
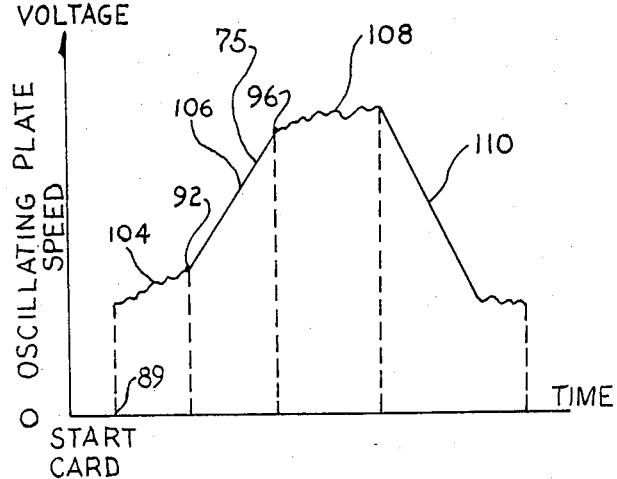
FIG. 2 is a graph illustrating the control operation of an oscillating plate in accordance with the present invention.

Referring now to FIG. 2, a control graph for the oscillating plate 28 is illustrated wherein an integrated oscillating plate control signal 75 is plotted versus time. Once again, the voltage curve is illustrated as following the start-up of an associated carding machine at point 89. A function of the weight of the fiber batt is sensed by the displacement of delivery roll 40 to generate a delivery weight signal 60 delivered to the controller 74. The graph is plotted over the same card operating time schedule as is the graph of the top feed roll illustrated in FIG. 3.

After card start-up, the oscillation speed of the plate is integrated over a portion 104 in response to the delivery weight signal. The oscillation plate control voltage 75 increases over the acceleration ramp 106 to keep up with the increased fiber needs of the carding machine as it is accelerated. The carding machine information is input over line 82 to the process controller 74. The carding machine reaches its normal operating speed at 96.

The delivery weight signal 60 and delivery roll signal 68 are integrated by controller 74 to generate the oscillating plate control signal 75 continuously over the portion of the curve 108 as variations in the delivery weight signal 60 occur. The operation of the oscillating plate 28 and the feed roll 18 will be synchronized by the delivery roll signal 68 during operation of the chute feed and associated carding machine. The deceleration phase of the carding machine is illustrated at ramp 110 whereupon the oscillating speed of the plate 28 decreases during deceleration and decreased weight of the fiber batt accordingly.

By synchronizing the operation of the feed roll 18 and oscillating plate 28 in response to the speed of delivery roll 38, effective synchronization of the chute feed operations is achieved in response to the chute output. The result is a more constant delivery weight of fiber batt 44 regardless in the variations in the delivery roll speed and to changes in the operating conditions of the associated carding machine.

In accordance with the method, the fiber quantity signal 52 and the delivery roll signal 68 are integrated in a controller to produce a feed roll control signal 71. The delivery weight signal 60 and the delivery roll signal 68 are integrated in a controller to produce an oscillating plate control signal 75 which is controlled with said feed roll 38 in a coordinated manner. The operation of the feed roll 18 and the oscillating plate 28 are in synchronization with the delivery roll 38 so that the operation of the chute feed 10 is synchronized in a self-contained manner. A function of a second level 56b of the fiber contained in the formation chute is sensed which is greater than a first sensed level 56a of fiber. A second fiber quantity signal 54 is generated and fed to a controller 70 whereby a feed roll control signal 71 is produced to the second fiber quantity signal 54 to terminate the rotation of said feed roll.

A preset delivery roll signal 80 is input into the controller 70 which represents a prescribed delivery roll rotational speed which is compared to the delivery roll signal 68. A feed roll control signal 71 is generated which controls the rotation of said feed roll in an intermittent manner when the delivery roll signal 71 falls below the preset delivery roll signal 80.

In another feature of the method, a preset delivery weight signal 78 is input into the controller. The preset delivery weight signal 78 is compared to the delivery weight signal 60.

An airflow control signal 76 is produced which controls the operation of the airflow fan 22 when delivery weight signal 60 falls below the preset delivery weight signal 78 and the oscillation plate control signal 75 is above a predetermined value to increase the air pressure in the formation chute 16. The compaction of the fibers is augmented so that a batt 44 having a prescribed weight per length is discharged from said feed chute.

Thus, it can be seen that a highly advantageous construction for a control system for a textile chute feed can be had in accordance with the invention which may be applied to a wide chute feed for feeding wide carding machines up to four meters in width.

While a preferred embodiment of the invention has been described using specific terms, such description is for illustrative purposes only, and it is to be understood that changes and variations may be made without departing from the spirit or scope of the following claims.

What is claimed is:

1. A control system for a chute feed of the type which includes a feed roll for feeding fiber to a fiber batt formation chute, an oscillating plate mounted for compacting the fibers in the formation chute, a pair of delivery rolls for discharging the compacted fibers in the form of a fiber batt, and airflow means for delivering a flow of fiber-laden air into said formation chute, said control system comprising a delivery weight signal generator means for sensing a function of the weight of fiber in said fiber batt and generating a delivery weight signal representative of said quantity of fibers, a first fiber quantity signal generator means for sensing a quantity of said fibers in said formation chute and generating a first fiber quantity signal representative of said quantity of fibers, a control means for receiving said delivery weight signal and said first fiber quantity signal for generating an oscillating plate control signal for controlling the rate oscillation of said oscillating plate within said formation chute in response to said delivery weight signal, and for also generating a feed roll control signal for controlling the rate of rotation of said feed roll in response to said first fiber quantity signal, wherein said control system further comprises:

said first fiber quantity signal generator means disposed at a first level of said formation chute for sensing a fiber quantity condition at a prescribed first level in said formation chute and generating said first fiber quantity signal in response to sensing said fiber quantity condition;

second fiber quantity signal generator means disposed at a second level of said formation chute above said first level for sensing a second fiber quantity condition at a second prescribed level in said formation chute physically above said first level and generating a second fiber quantity signal in response to sensing said fiber quantity condition at said second prescribed level;

said control means receiving said first fiber quantity signal to control said feed roll in a normal mode of operation and receiving said second fiber quantity signal for modifying said feed roll control signal and the normal mode of operation of said feed roll in accordance with said second fiber quantity signal to reduce the rotation of said feed roll beyond that provided by said first fiber quantity signal;

said control system including a preset delivery weight signal input to said control means, said control means comparing said preset delivery weight signal and said delivery weight signal for producing an airflow control signal when said delivery weight signal falls below said preset delivery weight signal, said airflow control signal separately controlling the operation of said air flow means at an increased rate when said delivery weight signal falls below said preset delivery weight signal to assist said oscillating plate in the compaction of said fibers in said formation chute so that said fibers are compacted to a required density for providing a prescribed batt weight per unit length discharged from said formation chute.

2. The control system of claim 1 wherein said control means generates said modified feed roll control signal to terminate the rotation of said feed roll until said level of fibers falls generally below said second prescribed level of said fibers in said formation chute.

3. The control system of claim 1 wherein at least one of said delivery rolls is driven in rotation, and further including a delivery roll signal generator means for sensing the rotational speed of said driven delivery roll and generating a delivery roll signal in proportion to the rotational speed of said delivery roll, and said control means receiving said delivery roll signal for integrating said fiber quantity signal and said delivery roll signal for controlling the rotational speed of said feed roll in synchronization with said delivery roll.

4. The control system of claim 3 including a preset delivery roll signal representing a prescribed rotational speed of said driven delivery roll, said control means receiving and comparing said preset delivery roll signal and said delivery roll signal for modifying said feed roll control signal to control said feed roll where it rotates in an and/or intermittent manner when said delivery roll signal is below said preset delivery roll signal.

5. The control system of claim 3 wherein said delivery roll signal is integrated with said delivery weight signal to generate a synchronized oscillating plate control signal for coordinated control of the operation of said feed roll and said oscillation plate.

6. The control system of claim 1 wherein said control means produces said airflow control signal when said oscillating plate control signal is above a predetermined value and said delivery weight signal falls below said preset delivery weight value.

7. A control system for a chute feed of the type which includes a feed roll for feeding fibers to a formation chute, means for compacting the fibers in the formation chute, and delivery roll means for discharging the compacted fibers in the form of a fiber batt, said control system comprising;

delivery roll signal generator means for sensing a rotational speed of said delivery roll means and generating a delivery roll signal proportional to said rotational speed;

a preset delivery roll signal corresponding to a prescribed low value of the rotation of said delivery roll means;

control means receiving said delivery roll signal and said preset delivery roll signal and for producing an integrated feed roll control signal for controlling the rotation of said feed roll in a continuously increasing/decreasing manner during a normal mode of operation;

said control means comparing said delivery roll signal and said preset delivery roll signal for producing a feed roll control signal when said delivery roll signal is below said preset delivery roll signal to control the operation of said feed roll in an on-/off intermittent manner during a startup mode of operation.

8. The control system of claim 7 including a first fiber quantity signal generator means for sensing a fiber quantity condition at a first level in said formation chute and also for generating a first fiber quantity signal representative of said fiber quantity condition, said control means receiving said first fiber quantity signal and integrating said first fiber quantity signal with said delivery roll signal to produce an integrated feed roll control signal whereby said feed roll is synchronized with said delivery roll operation.

9. The control system of claim 8 including a second fiber quantity signal generator means for sensing a fiber quantity condition at a second level in said formation chute which is above said first level in said formation chute, said second fiber quantity signal generator means generating a second fiber quantity signal representative of said fiber quantity condition, said control means receiving said second fiber quantity signal for producing a feed roll control signal to reduce the rotation of said feed roll and to reduce the quantity of fibers in said formation chute.

10. The control system of claim 8 wherein said delivery roll means is driven in response to a carding machine to which said discharged fiber batt is delivered for carding, and said control means receives card input information from said carding machine indicating the operational condition of said carding machine for processing with said fiber quantity signals, and delivery roll signal.

11. A control system for use in a textile chute feed of the type which includes a formation chute in which fibers are compacted by an oscillating plate, a rotating delivery roll means at the bottom of said formation chute for discharging said compacted fibers in the form of a fiber batt, airflow means for delivering a flow of fiber-laden air into said formation chute, drive means for oscillating said oscillation plate, wherein said control system comprises:

delivery weight signal generator means for sensing a function of the weight of fiber in said batt which is discharged from said chute feed and also for generating a delivery weight signal which is proportional to the weight of said discharged batt;

control means for receiving said delivery weight signal and producing an oscillating plate control signal in response thereto for controlling the operation of said drive means for said oscillating plate in a predetermined ratio to the delivery weight of said fiber batt discharged from said chute feed;

a preset delivery weight signal representing a prescribed fiber batt delivery weight;

said control means receiving and comparing said delivery weight signal and said preset delivery weight signal to produce an airflow control signal which controls the operation of said airflow means independently of the control of said oscillating plate for increasing the air pressure in said formation chute for assisting in the compaction of said fibers in said formation chute when said delivery weight falls below said preset delivery weight signal and said oscillation plate control signal is above a predetermined value indicating that said oscillating plate has reached an upper operational limit and cannot alone compact said fibers to produce said prescribed fiber batt delivery weight; and said airflow control signal being generated when said oscillating plate has reached said operational limit to separately control the operation of said airflow means to increase the air pressure in said formation chute;

whereby said fibers in said formation chute are compressed and compacted to a required density so that a fiber batt of a prescribed weight per length is discharged from said chute feed.

12. The control system of claim 11 further including:
a delivery roll signal generator means for sensing the rotational speed of said delivery roll and for generating a delivery roll signal proportional to said rotational speed of said delivery roll; and
said control means receiving said delivery roll signal and integrating said delivery roll signal with said delivery weight signal to produce an oscillating plate control signal in a synchronized manner.

13. The control system of claim 12 wherein said delivery roll is driven in relation to the operating speed of a carding machine.

14. The method of controlling a textile chute feed of the type which includes a feed roll for feeding fibers to a formation chute, compaction means for compacting fibers in the formation chute, and a rotating delivery roll for discharging said compacted fiber in the form of a fiber batt, wherein said method comprises:
sensing a function of the delivery weight of said fiber batt discharged from said chute feed and generating a delivery weight signal proportional to said delivery weight for controlling the operation of said oscillating plate;
compacting the fibers with an oscillating plate in said formation chute;
providing an airflow means for delivering a fiber-laden airflow into said formation chute;
increasing the delivery of said airflow means independently of the operation of said oscillating plate when said delivery weight falls below a predetermined value and said oscillation plate is driven above a predetermined value indicating that said oscillation plate has reached an upper operational limit and can no longer produce said predetermined delivery weight value in a manner that air pressure is increased in said formation chute to assist said oscillation plate in the compaction of said fibers; and
generating an airflow control signal when said oscillating plate has reached said operation limit for controlling said airflow means separately from said oscillating plate to increase said air pressure in said chute feed;
whereby a fiber batt having a prescribed weight per unit length is discharged from said chute feed.

15. The method of claim 14 including:
controlling the rotation of said feed roll in a predetermined ratio to the level of fiber in said formation chute in a continuous manner; and
rotating said feed roll intermittently in an "off" and "on" manner in response to the detection of said delivery roll rotating below a predetermined rotational speed.

16. A method of controlling a textile chute feed of the type which includes a feed roll for feeding fibers to a formation chute, an oscillating plate for compacting fibers in the formation chute, and a rotating bottom delivery roll for discharging said compacted fibers in the form of a fiber batt, wherein said method comprises:
sensing a function of the level of fiber contained in said formation chute and generating a fiber quantity signal proportional to said sensed level of fiber;
sensing a function of the weight of said fiber batt discharged from said chute feed and generating a delivery weight signal proportional to said delivery weight of said batt;
sensing the rotational speed of said rotating delivery roll and generating a delivery roll signal proportional to said sensed rotational speed of said delivery roll;
integrating said fiber quantity signal and said delivery roll signal in a controller to produce an integrated feed roll control signal which controls said feed roll in a continuously increasing/decreasing manner;
integrating said delivery weight signal and said delivery roll signal in a controller to produce an oscillating plate control signal which is controlled with said feed roll in a coordinated manner;
controlling the operation of said feed roll and said oscillating plate in synchronization with said delivery roll so that the operation of said chute feed is synchronized in a self-contained manner; and
loading a preset delivery roll signal into said controller which represents a prescribed delivery roll rotational speed, and comparing said preset delivery roll signal and said delivery roll signal for providing a feed roll control signal which controls the rotation of said feed roll in an on/off intermittent manner when the delivery roll signal is below said preset delivery roll signal during startup operation of said chute feed.

17. The method of claim 16 including:
loading a preset delivery weight signal into said controller;
comparing said preset delivery weight signal and said delivery weight signal; and
producing an airflow control signal which controls the operation of said airflow means when said delivery weight signal falls below said preset delivery weight signal and said oscillation plate control signal is above a predetermined value to increase the air pressure in said formation chamber to assist in the compaction of said fibers so that a batt having a prescribed weight per length is discharged from said feed chute.

* * * * *